May 2, 1933. L. OLAS 1,906,881
SAW SHARPENING TOOL
Filed Feb. 10, 1932
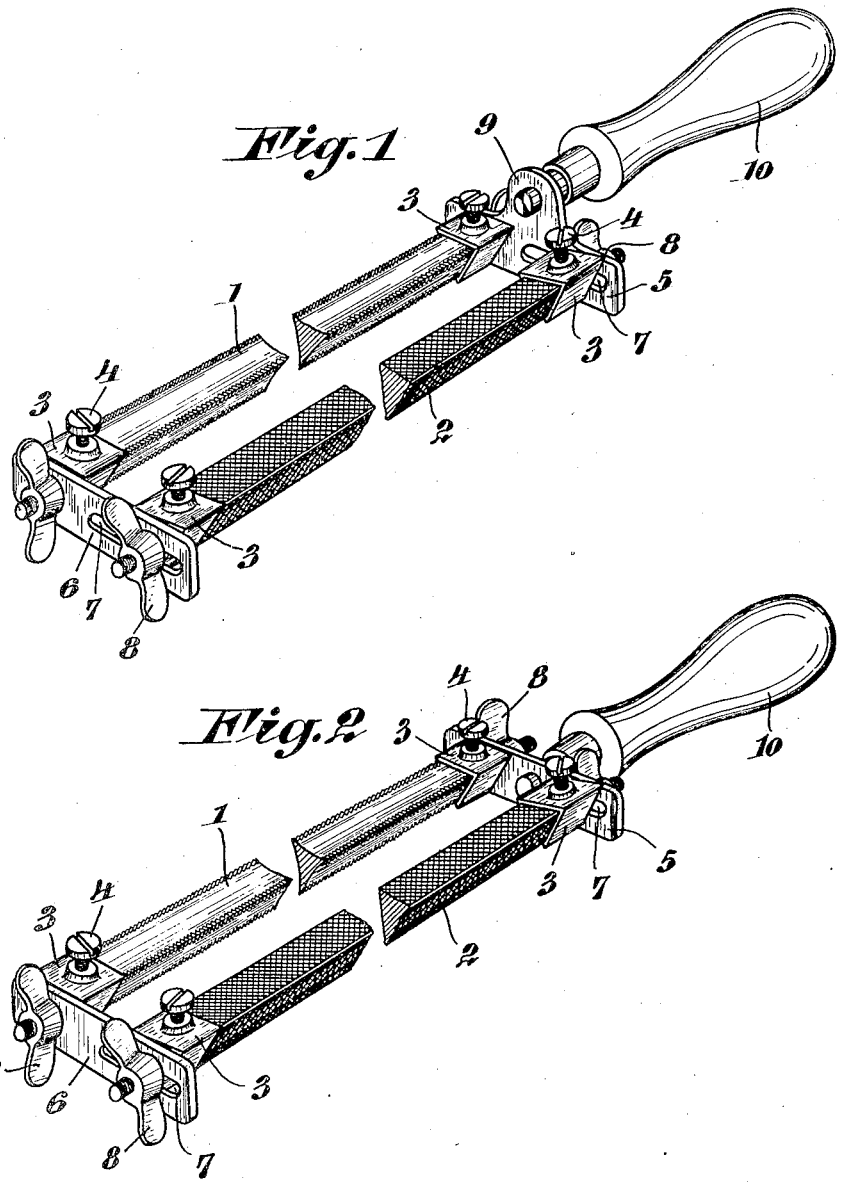
L. Olas
INVENTOR
By: Marks & Clerk
ATTYS Patented May 2, 1933

1,906,881

UNITED STATES PATENT OFFICE

LUDWIG OLAS, OF VIENNA, AUSTRIA

SAW SHARPENING TOOL

Application filed February 10, 1932, Serial No. 592,089, and in Austria May 26, 1931.

This invention relates to an improved saw sharpening tool by which all teeth of a saw can be filed to a uniform depth and the faces of teeth can be uniformly sharpened in such manner, that the pitch and root of tooth remain alike during repeated sharpening, which aim cannot be attained when sharpening a saw with a file.

In the accompanying drawing have been illustrated two simple and preferred forms of embodiments of the invention, it being, however, understood that no limitation is necessarily made to the precise structural details therein set forth, but that the right is reserved to any changes, alterations, and modifications to which recourse may be had without departing from the spirit of the invention or sacrificing the advantages of the same.

Two modes of carrying out the present invention are illustrated by way of example on the accompanying sheet of drawings, Figs. 1 and 2 being perspective views of saw sharpening tools of different constructions.

The edges of the roughing cutter 1 are cut like a file, while the sides thereof are smooth and slightly hollow. The edges of the sharpener 2 are smooth and blunt, while the sides thereof are cut like a file. Both, the roughing cutter 1 as well as the sharpener 2 are long three-cornered prismatic members of steel and their ends are fitted in sleeves 3 and fixed therein by means of screws 4.

The sleeves 3 are provided with screw-pins, which extend through holes or slots 7 of cross members 5 and 6. The sleeves 3 are rotatably fixed in said cross members by winged nuts 8, after the roughing cutter 1 and the sharpener 2 have been adjusted apart preferably for two or more pitches of teeth of the saw. A handle 10 is secured to the cross member 5. In the construction shown in Fig. 1 the handle 10 is fixed above the cutter 1 and sharpener 2, while in the embodiment illustrated in Fig. 2 the handle 10 is disposed between and in the plane of the cutter 1 and sharpener 2.

The roughing cutter 1 is rotatably secured in the cross members 5, 6 and, if desired, may be laterally adjustable like the sharpener 2.

When in use, the downwardly directed rough edge of the cutter files deeper the tooth space of the saw until its smooth prismatic faces co-operate and slide over the tooth-faces. However the two prismatic sides of the sharpener 2 sharpen the tooth-faces of the saw until its downwardly directed smooth edge reaches the depth of the tooth space cut by the cutter 1.

The result of this positively preceding sharpening operation is, that all tooth points of the saw are disposed in a quite straight line, thus yielding the best cutting results.

However if desired only the roughing cutter 1 or the sharpener 2 may be fitted in the holder in order to set the depth of the tooth space of the saw or to sharpen the tooth-faces only.

I claim:—

Saw sharpening tool, comprising in combination a cornered roughing cutter with smooth longitudinal sides but with the longitudinal edges cut like a file, a cornered sharpener with the longitudinal sides cut like a file but with the longitudinal edges quite blunt, bearing plates in which the ends of said cutter and sharpener are mounted, means in said bearing plates for setting the distance between said cutter and sharpener, and a handle secured to one of said plates.

In testimony whereof I affix my signature.

LUDWIG OLAS.